United States Patent [19]
Pett

[11] 3,934,812
[45] Jan. 27, 1976

[54] VALVE CONSTRUCTION AND FLOW RESTRICTOR FOR USE THEREWITH
[75] Inventor: Alfred W. Pett, Warwick, R.I.
[73] Assignee: New England Union Co., West Warwick, R.I.
[22] Filed: Apr. 28, 1975
[21] Appl. No.: 572,619

[52] U.S. Cl. .................. 251/45; 251/43; 251/30; 138/43
[51] Int. Cl.² ............. F16K 31/385; F16K 31/40
[58] Field of Search ............... 251/45, 44; 138/43

[56] References Cited
UNITED STATES PATENTS
| | | | |
|---|---|---|---|
| 1,813,979 | 7/1931 | West | 138/43 |
| 2,235,304 | 3/1941 | Toussaint | 251/45 |
| 2,323,115 | 6/1943 | Bryant | 138/43 |

Primary Examiner—Arnold Rosenthal
Attorney, Agent, or Firm—Salter & Michaelson

[57] ABSTRACT

A valve construction for controlling the flow of a fluid therethrough and including a restrictor member that is located in a control chamber and that communicates with the control pilot valve and an interior chamber having access to a pressure responsive diaphragm, the restrictor member providing for sufficient flow of fluid to the interior chamber in relatively large valve sizes to enable the diaphragm to open or close the valve at a reasonable valve closing rate, the closing of the valve being slow enough to prevent the occurrence of water hammer in the system.

6 Claims, 4 Drawing Figures

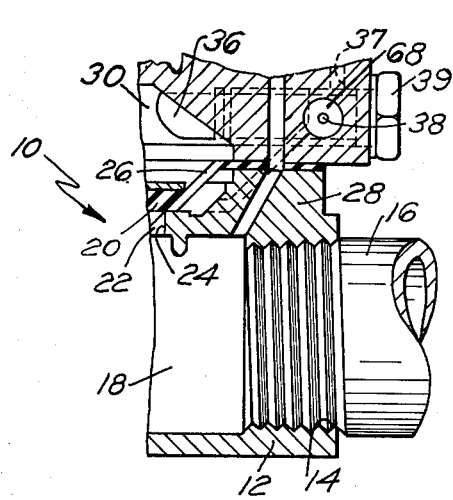
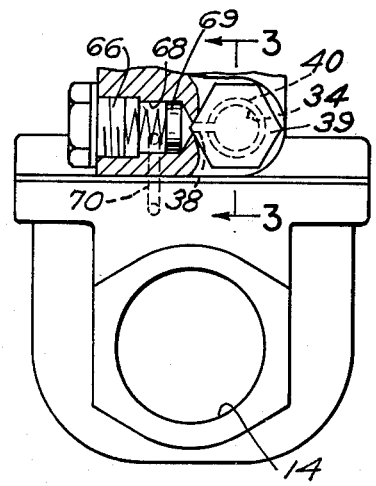
FIG. 1    FIG. 2
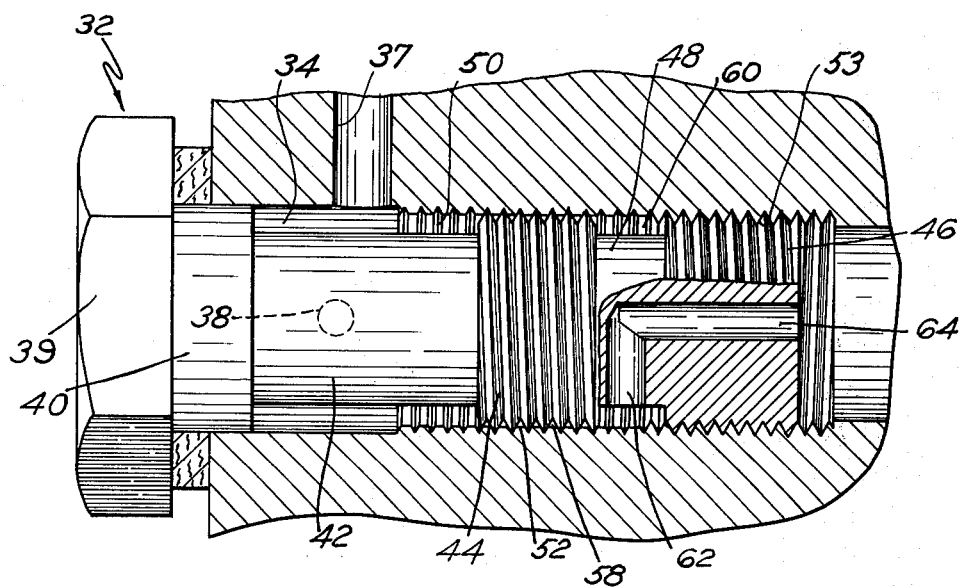
FIG. 3
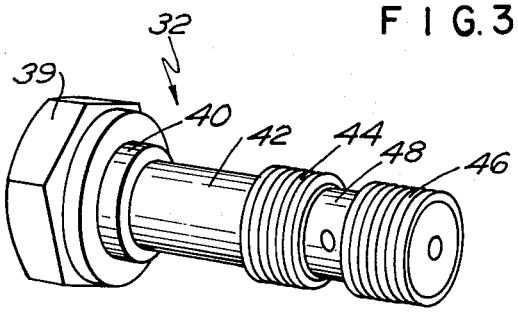
FIG. 4

VALVE CONSTRUCTION AND FLOW RESTRICTOR FOR USE THEREWITH

BACKGROUND OF THE INVENTION

The present invention relates to solenoid operated valves, and has particular application in a remotely controlled valve, wherein the valve is either closed or in a fully open position such as in an electrically operated irrigation system. In U.S. Pat. No. 3,791,619, a valve construction of the type embodied in the subject invention is disclosed for use in a lawn sprinkler system that includes a diaphragm valve assembly that is effective to absorb the kinetic energy that is present in the fluid system upon closing of the valve therein to prevent the occurrence of water hammer in the system. The valve construction as described in U.S. Pat. No. 3,791,619 includes a pilot valve that communicates with a primary fluid control chamber, which chamber has a restricted passage formed therein, that communicates with an interior chamber located behind the diaphragm. A secondary fluid control chamber communicates through a passage with the inlet side of the main valve unit and beneath the diaphragm, the secondary chamber also communicating with the primary chamber. A restrictor member is located in the primary chamber and defines a spirally extending restricted passage for restricting flow of fluid therethrough, wherein flow of fluid to and from the interior chamber is restricted to produce gradual changes in the differential pressure across the diaphragm.

Although the valve construction as disclosed in U.S. Pat. No. 3,791,619 is effective to prevent the occurrence of water hammer in the fluid system in which it is installed, the helical passage as formed by the restrictor in the control chamber is not feasible for use in valve sizes from three-fourths inch to 2 inches in the same envelope size. In order to adapt the helical passage in the interior chamber as defined by the restrictor to the larger size valve, so as to allow fluid to fill the interior chamber over the diaphragm at a reasonable valve closing rate, the control chamber would have to be provided with threads that only would allow engagement of the restrictor with the outer edge therein. This would considerably weaken the engagement of the restrictor within the control chamber and would adversely effect the operation of the valve construction.

SUMMARY OF THE INVENTION

The present invention is an improvement of the flow restricting means as disclosed in U.S. Pat. No. 3,791,619, but has particular application in larger size valves as employed in an electrically operated irrigation system, wherein a predetermined thread design may be utilized in the control chamber for accommodating the appropriate restrictor member as required over a relatively wide range of valve sizes.

The flow restricting means as provided in the subject invention includes an elongated cylindrical control chamber that directly communicates with the pilot valve of the valve construction, a restrictor member being located in the control chamber and including a first threaded portion that threadably engages a first threaded section of the control chamber to positively locate said restrictor member therein. A second threaded portion of said restrictor member cooperates with a section of the control chamber to define a spirally extending restricted passage, a separate passage means being formed in the restrictor member and communicating with the spirally extending restricted passage and said interior chamber for directing fluid thereto, wherein flow of the fluid to and from the interior chamber is controlled to produce gradual changes in the differential pressure across the valve.

Accordingly, it is an object of the present invention to provide a solenoid operated valve construction, wherein the closing rate of a diaphragm valve located therein is controlled by a restrictor member located in a control chamber, the restrictor member defining a flow restricting passage in said control chamber that enables closing of the valve to be varied in accordance with the size of the valve employed.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a fragmentary vertical sectional view with parts shown in elevation of the valve construction emobided in the present invention;

FIG. 2 is an end elevational view with parts shown in section of the valve construction, looking to the left as seen in FIG. 1;

FIG. 3 is an enlarged sectional view with parts broken away taken along line 3—3 in FIG. 2, showing the details of the restrictor member as embodied in the subject invention; and FIG. 4 is a perspective view of the restrictor member of the subject invention.

DESCRIPTION OF THE INVENTION

Referring now to the drawing, and particularly to FIG. 1, a portion of the valve construction as embodied in the present invention is illustrated, the valve construction being generally indicated at 10. The valve construction 10 is similar in concept and in the constructional details thereto to the valve construction illustrated in U.S. Pat. No. 3,791,619, and reference thereto is made for a more complete illustration and description of the details of the unit embodied herein. As described in Pat. No. 3,791,619, the valve construction is intended for use in a lawn sprinkler system; although, the concept of the invention as embodied in the prior patent and herein is intended for use in any fluid system that requires an arrangement for preventing too rapid closing of a remotely controlled valve, wherein water hammer in the system is prevented.

The valve construction 10 includes a body portion 12 that defines the main valve unit and has an inlet port (not shown) and an outlet port 14, both ports being internally threaded for receiving an inlet pipe (not shown) and an outlet pipe 16, respectively, therein. Formed in the body portion 12 and communicating with the inlet port is an inlet chamber (not shown), while an outlet chamber 18 is formed in the opposite portion of body portion 12 and communicates with the outlet port 16. Not illustrated completely in the present invention, but disclosed in more detail in U.S. Pat. No. 3,791,619, is a diaphragm assembly that includes a seat portion 20 that that is engageable with a seat 22 for sealing an opening 24 through which fluid passes from the inlet chamber to the outlet chamber 18. Integrally joined to the seat portion 20 of the diaphragm valve assembly is a flexible membrane 26 that is secured between a flange 28 joined to the body portion 12 and a flange formed on a cap portion (not shown) that is mounted on the body portion 12 in fixed relation by cap screws, as illustrated in U.S. Pat. No. 3,791,619. The cap portion has a crown configuration that defines an interior chamber 30 that is formed between the upper portion of the diaphragm and the underside of the cap portion. As further illustrated and described in U.S. Pat. No. 3,791,619, a pilot valve is provided for remotely controlling the operation of the valve construction and includes a solenoid valve of conventional design and operation.

In order to limit the flow rate of change of fluid passing through the valve construction 10, a restrictor member generally indicated at 32 is provided and is located in a fluid control chamber 34 formed in the portion of the body portion 12 that is adjacent to the cap portion, the axis of the chamber 34 being generally horizontal and the innermost end thereof communicating with the diaphragm chamber 30 by way of an opening 36. Formed in the body portion of the valve construction adjacent to the control chamber 34 is a passage 37 that interconnects the chamber 34 to the pilot control valve (not shown), while another passage 38 is also formed in the body portion adjacent to the cap portion and provides communication between the chamber 34 and a secondary chamber to be described. The restrictor member 32 is formed with a head 39 to which a neck 40 is joined, the neck 40 projecting into the control chamber 34. Joined integrally to the neck 40 is a stem 42 that is received in the control chamber 34, a first threaded portion 44 being formed on the stem 42 intermediate the ends thereof. A second threaded portion 46 is spaced from the first threaded portion 44 and defines an annular land 48 therebetween. A major portion of the interior wall of the chamber 34 is formed with female threads 50, which as illustrated in FIG. 3, have a flat-tooth configuration 52 for a portion of the length thereof. A second length of threads 53 are formed in the interior wall of the central chamber 34 adjacent to the threaded portion 46 of the stem 42 and are formed with a conventional tooth configuration for the purpose to be set forth hereinafter.

As more clearly illustrated in FIG. 3, the flat tooth configuration 52 of the threads 50 as formed in the chamber 34 define a spirally extending, restricted passage 58 through which the fluid flows from the chamber 34 to a chamber 60 as defined between the annular land 48 and the adjacent threaded portion of the chamber 34. Communicating with the annular chamber 60 as defined by the land 48 is a radially extending passage 62 that extends into the stem 42 of the restrictor member 32, the radially extending passage 62 communicating with an axially extending passage 64 formed centrally of the stem 42 adjacent to the outermost end thereof. The passage 64 communicates with the opening 36 and provides for egress of fluid from the control chamber 34 into the diaphragm control chamber 30. It is seen that the flow of fluid from the chamber 34 through the spirally extending passage 58 is restricted until it reaches the annular chamber 60 whereafter the fluid exits through the passages 62 and 64 into the diaphragm control chamber 30.

In order to further control the closing rate of the diaphragm assembly, it is necessary to provide communication between the control chamber 34 and the inlet chamber (not shown) and for this purpose a secondary chamber 68 illustrated in FIG. 2 is provided and has a threaded plug 66 located in an end thereof. A secondary chamber corresponding to the chamber 68 is more clearly shown and described in U.S. Pat. No. 3,791,619; and as further illustrated in FIG. 2, the chamber 68 includes a filter 69 that is located adjacent to the passage 38 and that is maintained in position by a spring connected to the plug 66. It is sufficient to state for the purposes herein that the control chamber 34 communicates with the chamber 68, by means of the passage 38, the chamber 68 further communicating with the valve construction inlet chamber through an obliquely extending passage 70 (FIG. 2).

In the general operation of the valve construction embodied herein, the fluid passing through the passages 58, 62 and 64 affects the closing rate of the seat portion 20 of the diaphragm assembly and therefore the flow of fluid through these passages correspondingly produces a closing of the diaphragm assembly without damage or noise due to water hammer in the piping system associated with the valve construction. It is seen that in order to obtain the flow necessary to produce a more rapid closing for larger type valves, the passages 62 and 64 are formed in the restrictor member 32, and it is understood that the outer threaded portion 46 as formed on the stem 42 of the restrictor member 32 enables the restrictor member to be firmly anchored in the chamber 34 through the engagement of the threads 46 with the adjacent threaded section 53 of the chamber 34. The flat tooth portions 52 of the threaded portion 50 effectively restrict flow of the fluid until it reaches the annular chamber as defined by the annular land 48. Flow of the fluid thereafter advances through passages 62 and 64 into the diaphragm control chamber 30. As described in U.S. Pat. No. 3,791,619, the valve construction 10 is remotely controlled by energizing a solenoid that operates the solenoid pilot valve. Opening and closing of the diaphragm valve assembly is produced as described in U.S. Pat. No. 3,791,619, it being understood that the improvement as embodied herein is directed to the control of the fluid passing through the restrictor member 32. it is seen that securement of the restrictor member in the chamber 34 is accomplished primarily by the engagement of the threads 46 with the threads 53. Since the restrictor member 32 is adequately secured in place by the engagement of threads 46 with the threads 53. Since the restrictor member 32 is adequately secured in place by the engagement of threads 46 and 53, firm engagement of the threads 44 with the threads 50 or 52 is not essential or required. Further, since the volumetric flow rate of the fluid passing through the passages 58, 62 and 64 is essentially the same, the pressure loss through passages 62 and 64 is negligible as compared to the pressure loss through passage 58, and this is due to the relative difference in cross sectional area of the passages.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve construction for controlling flow of a fluid therethrough, comprising a body portion to which an inlet pipe and an outlet pipe are connected, an inlet chamber communicating with said inlet pipe and an outlet chamber communicating with said outlet pipe, a movable diaphragm located in said body portion and normally sealing communication between said inlet and outlet chambers, an interior chamber formed in said body portion between said diaphragm and a wall of said body portion, an interior pilot valve located in said body portion and that is operable to induce flow of fluid to and from said interior chamber for controlling the pressure differential across said diaphragm, wherein the diaphragm is flexed in accordance with the pressure differential thereacross to control communication between said inlet and outlet chambers, and means communicating with said inlet chamber and said interior chamber for restricting flow of fluid to and from said interior chamber so as to prevent too rapid closing of said diaphragm and thereby preventing water hammer from occurring in said pipes, said flow restricting means including an elongated cylindrical control chamber that directly communicates with said pilot valve, a restrictor member located in said control chamber and including a first threaded portion that threadably engages a first threaded section of said control chamber to positively locate said restrictor member therein, a second threaded portion of said restrictor member cooperating with a second threaded section of said control chamber to define a spirally extending restricted passage, and passage means formed in said restrictor member and communicating with said spirally extending restricted passage and said interior chamber for directing fluid thereto, wherein flow of fluid to and from said interior chamber is controlled to produce gradual changes in the differential pressure across said diaphragm, said flow restricting means further including a secondary chamber that communicates with said control chamber and that cooperates therewith to produce the gradual changes in the differential pressure across said diaphragm.

2. A valve construction as claimed in claim 1, said threaded portions as formed on said restrictor member being disposed in spaced relation to define an intermediate reduced land therebetween that cooperates with the adjacent wall of said control chamber to form an annular interior chamber, said annular interior chamber communicating with said spirally extending passage and said passage means to direct the fluid thereto.

3. A valve construction as claimed in claim 2, said passage means including a radial passage formed in said intermediate reduced land of said restrictor member, and an axially extending passage formed interiorly of said restrictor member that communicates with said radial passage to provide for flow of fluid therethrough to said interior chamber.

4. A valve construction as claimed in claim 2, the threads of said second threaded section of said control chamber having a flat-tooth configuration, wherein the threads in the second threaded section of said control chamber and the threads of said second threaded portion of said restrictor member define said spirally extending restricted passage.

5. A valve construction as claimed in claim 4, the threads of said first threaded portion being fully received in the threads of said first threaded section to define a relatively tight fitting threaded interconnection that provides for a mechanical interlocking of said restrictor member in said control member.

6. A valve construction as claimed in claim 5, said passage means including a radial passage formed in said intermediate reduced land of said restrictor member, and an axially extending passage formed interiorly of said restrictor member that communicates with said radial passage to provide for flow of fluid therethrough to said interior chamber.

* * * * *